May 17, 1932.  A. F. MASURY  1,858,782
INDIVIDUAL WHEEL MOUNTING AND DRIVE
Filed June 19, 1929
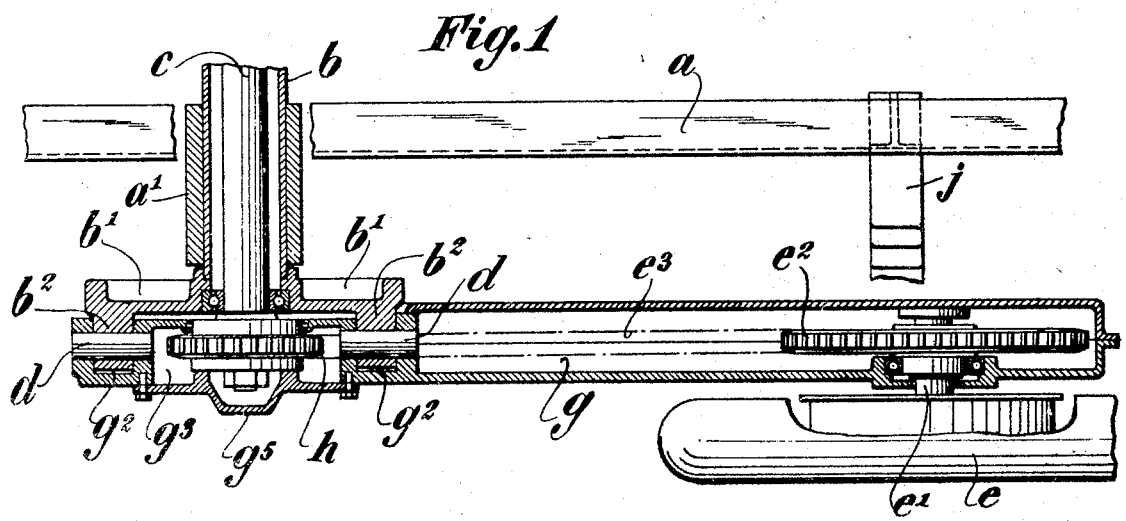
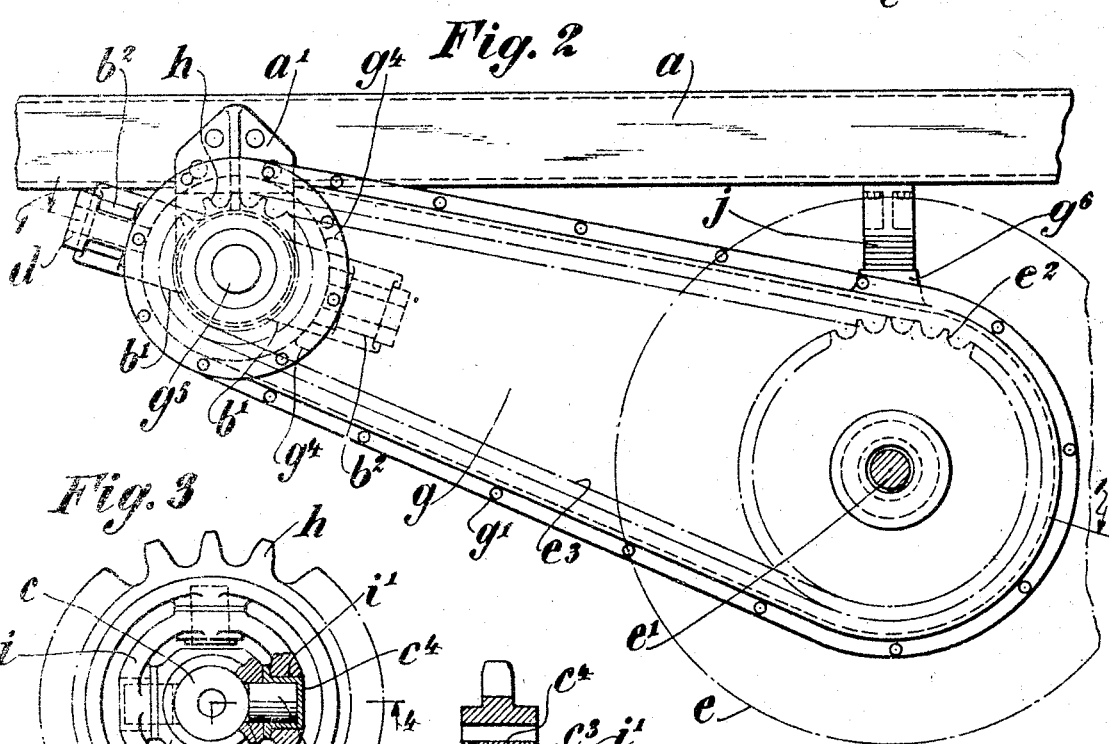
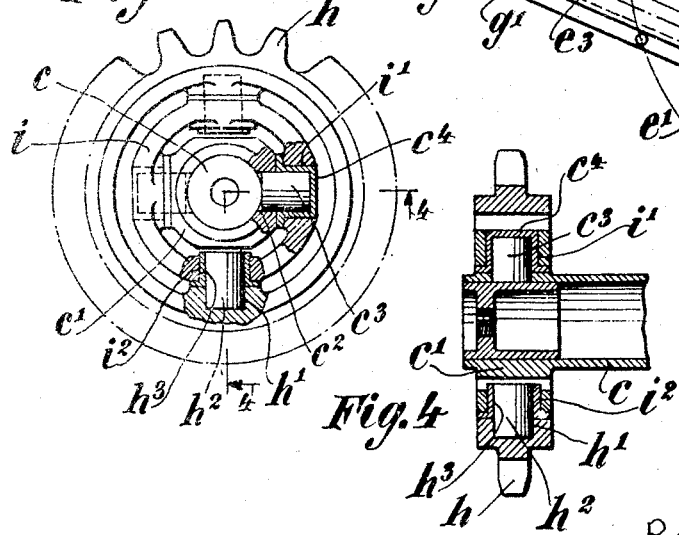
Inventor:
Alfred F. Masury,
By his Attorneys:
Redding, Greeley, O'Shea & Campbell Patented May 17, 1932

1,858,782

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INDIVIDUAL WHEEL MOUNTING AND DRIVE

Application filed June 19, 1929. Serial No. 372,089.

The present invention relates to wheel mountings for motor vehicles and embodies, more specifically, an improved form of wheel mounting in which provision is made for movement of the wheel in a plurality of planes with respect to the frame of the vehicle and in which an improved form of drive is incorporated between the wheel and live axle.

The most recent development in spring suspensions for motor vehicles has utilized individually mounted and driven wheels and the best practice provides for movement of the wheel with respect to the frame not only in a vertical longitudinal plane, but also in a vertical transverse plane. In order that the drive may be transmitted to the wheel effectively without regard to the position of the wheel, the present invention incorporates a new form of drive which utilizes a universally mounted driving sprocket. This driving sprocket is mounted upon the live axle with its axis corresponding to that of the wheel mounting so that the sprocket will assume the angles of the wheel mounting and transmit the drive in accordance therewith.

An object of the invention is, therefore, to provide an improved form of individually mounted wheel in which the driving elements are so constructed as to align themselves with the wheel regardless of the position assumed by the latter.

A further object of the invention is to provide an improved form of driving connection between the live axle section and an individually mounted wheel in which a universally mounted sprocket is incorporated in the driving members in such manner that the sprocket will automatically align itself with the driven wheel.

Further objects, not specifically enumerated above, will be apparent as the invention is described in greater detail in connection with the accompanying drawings, wherein:

Figure 1 is a view in section, taken on line 1—1 of Figure 2, and looking in the direction of the arrows.

Figure 2 is a view in side elevation, showing the wheel mounting of Figure 1.

Figure 3 is a detail view showing the universally mounted driving sprocket.

Figure 4 is a view in section, taken on line 4—4 of Figure 3, and looking in the direction of the arrows.

Referring to the above drawings, $a$ designates the vehicle frame having a bracket $a'$ secured thereto which carries an axle housing $b$ and live axle $c$. Upon the end of the axle housing $b$, a bracket having oppositely extending arms $b'$ is mounted. Each of these arms has outwardly extending portions $b^2$ which are apertured to receive hinge pins $d$. These hinge pins are aligned and the axes thereof pass through the axis of axle $c$, thus affording a bearing for movement in a plane transverse to that of the frame.

A wheel $e$ is mounted upon a stub shaft $e'$ which is journaled in a two part housing $g$, the parts thereof being secured by bolts $g'$. Recesses $g^2$ are formed in the housing to receive the outwardly extending portions $b^2$ of the arms $b'$.

A recess $g^3$ is formed in the housing $g$ coaxially with the axle $c$ and is adapted to receive a sprocket $h$, apertures $g^4$ being provided for communication between the interior of the housing $g$ and the aperture $g^3$. A cover plate $g^5$ is secured to the housing at the periphery of the recess $g^3$ and serves as a closure for such aperture. A driven sprocket $e^2$ is carried by the stub shaft $e$ and chain $e^3$, indicated in dot and dash lines in Figure 2, passes over the sprocket wheels $h$ and $e^2$ and through the apertures $g^4$. The mounting of the housing $g$ is of such character that it may turn about its own axis, as well as that of the axle $c$, and the driving sprocket $h$ is maintained in the plane of the housing $g$ without affecting the drive by means of a construction described hereinafter.

Upon the end of axle $c$, a driving member $c'$ is formed. This driving member is provided with diametrically opposed apertures $c^2$ within which pins $c^3$ are received. A carrier ring $i$ is formed with apertures $i'$ within which the pins $c^3$ extend. Bearing caps $c^4$ are mounted over the pins and prevent them from slipping out during operation. Diametrically opposed apertures $i^2$ are also formed in the carrier ring, the axes thereof being perpendicular to that of the apertures $i'$. The sprocket wheel $h$ is formed with inwardly extending recesses $h'$ within which pins $h^2$ are received. Bearing surfaces $h^3$ are carried between the pins $h^2$ and the apertures $i^2$. It will be seen that the above construction mounts the sprocket wheel $h$ universally and permits it to align itself with the plane of the housing $g$ under all conditions of operation, thus providing a highly effective drive. A cantilever spring $j$ is mounted on the frame member $a$ and extends outwardly over the housing $g$. A boss $g^6$ is formed on the housing $g$ and serves as a bearing surface upon which the spring $j$ bears, thus yieldingly opposing relative movement between the wheel $e$ and the frame $a$.

While the invention has been described with specific reference to the construction shown in the accompanying drawings, it is not to be limited, save as defined in the appended claims.

I claim as my invention:

1. In combination with a frame, an axle, an axle housing and a wheel, means to mount the wheel on the frame individually comprising a housing upon which the wheel is mounted, a bracket mounted rotatably on the axle housing, arms on the bracket, a driving sprocket mounted on the axle and carried within the housing, trunnions mounting the housing on the arms and lying in the plane of the sprocket, and means to mount the sprocket to follow the movement of the housing.

2. In combination with a frame, an axle, an axle housing and a wheel, means to mount the wheel on the frame individually comprising a housing upon which the wheel is mounted, means to mount the housing upon the axle housing with provision for movement in a plurality of planes, a driving sprocket mounted on the axle, and means to mount the sprocket in the housing with provision for universal movement with respect to the axle housing.

3. In combination with a frame, an axle, an axle housing and a wheel, means to mount the wheel on the frame individually comprising a housing upon which the wheel is mounted, means to mount the housing upon the axle housing with provision for movement in a plurality of planes, driving means in the housing, and means to mount the driving means upon the axle with provision for movement in a plurality of planes to cause it to be aligned with the housing in a plurality of positions thereof with respect to the axle and axle housing.

This specification signed this 12th day of June, A. D. 1929.

ALFRED F. MASURY.